(12) United States Patent
Kanungo et al.

(10) Patent No.: US 6,380,955 B1
(45) Date of Patent: *Apr. 30, 2002

(54) APPLET AND APPLICATION DISPLAY IN EMBEDDED SYSTEMS USING BUFFERLESS CHILD GRAPHICS CONTEXTS

(75) Inventors: Rajesh Kanungo, Sunnyvale; Venkatesh Narayanan, Fremont, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/595,600

(22) Filed: Jun. 15, 2000

Related U.S. Application Data

(63) Continuation-in-part of application No. 09/203,183, filed on Nov. 30, 1998.
(60) Provisional application No. 60/146,448, filed on Jul. 30, 1999.

(51) Int. Cl.[7] .................................................. G06F 3/14
(52) U.S. Cl. ........................ 345/764; 345/853; 709/312
(58) Field of Search ................................ 345/341, 343, 345/339, 348, 340, 350, 351, 352, 355, 356, 357, 764, 784, 803, 781, 835, 776, 775, 810, 848, 853, 854; 709/310, 311, 312

(56) References Cited

U.S. PATENT DOCUMENTS 5,548,745 A * 8/1996 Egan et al. .................... 703/27
5,802,530 A * 9/1998 Van Hoff ..................... 345/335
5,852,439 A * 12/1998 Musgrove et al. ........... 345/339
6,232,971 B1 * 5/2001 Haynes ........................ 345/340

* cited by examiner

Primary Examiner—Cao H. Nguyen
(74) Attorney, Agent, or Firm—Beyer Weaver & Thomas LLP

(57) ABSTRACT

A method and apparatus implementing a separate child context for each applet (or similar element) of a browser. A described embodiment of the present invention provides one or more child contexts that correspond to elements in the HTML for a web page displayed by a browser. For example, each applet executed by the browser has a corresponding and separate child context that points to an associated portion of a browser memory. The browser also has a parent context, which each child context points to. When a graphic is displayed via a widget, the widget draws the graphic (such as a panel or a non-pressed button) in the child context of the applet and sets a "damage" flag in the child context. When the browser performs its main browser loop, it checks the status of the damaged flag for each element (including each applet). If the browser finds a damage flag that is set, this means that something was written into the portion of the browser memory corresponding to the child context and that the parent buffer needs updating. In this case, the browser "pulls" the information from the portion of browser memory corresponding to the child context into the parent buffer, which is then used to update the display screen.

15 Claims, 18 Drawing Sheets

Parent and Child Contexts

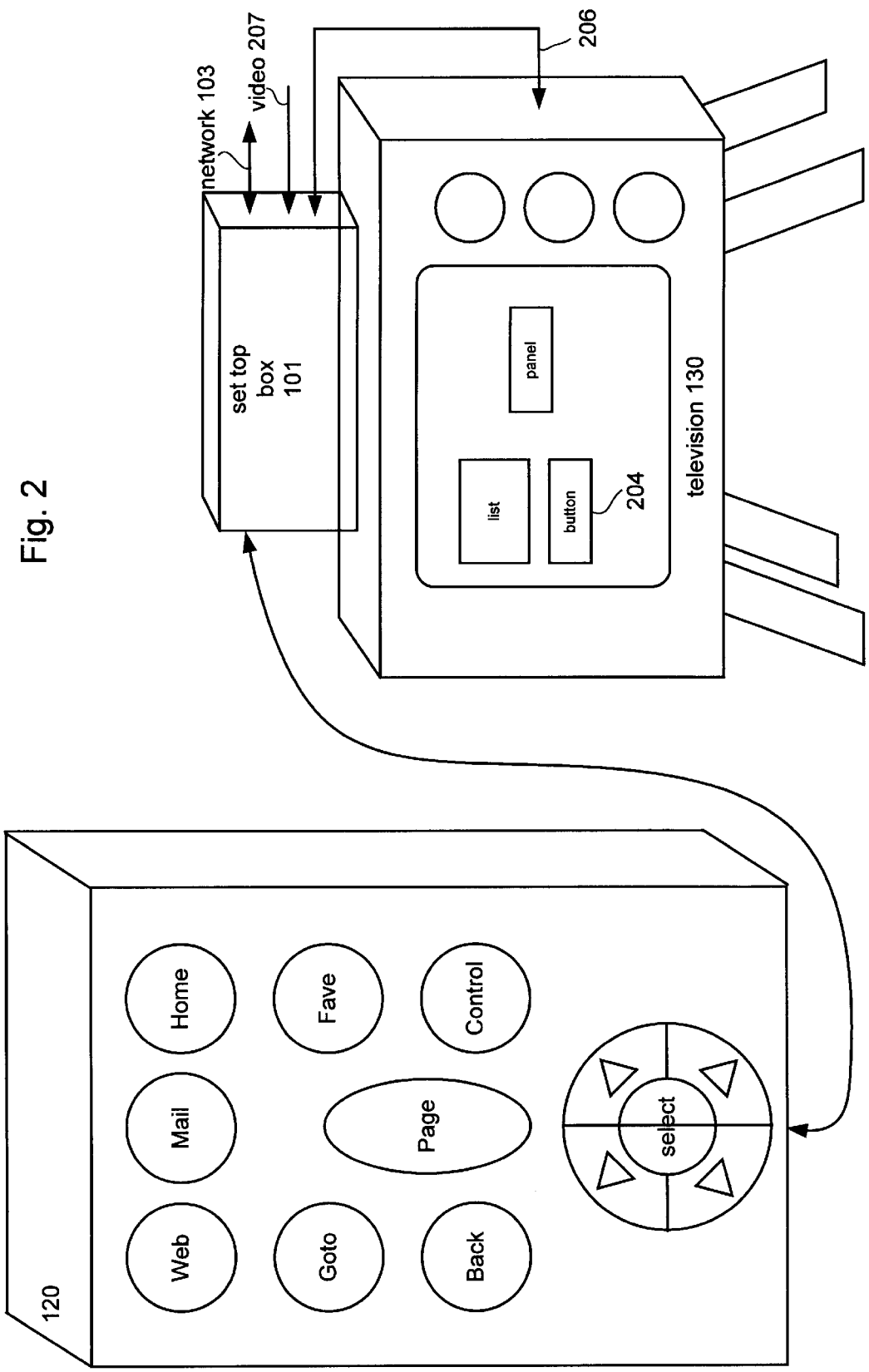

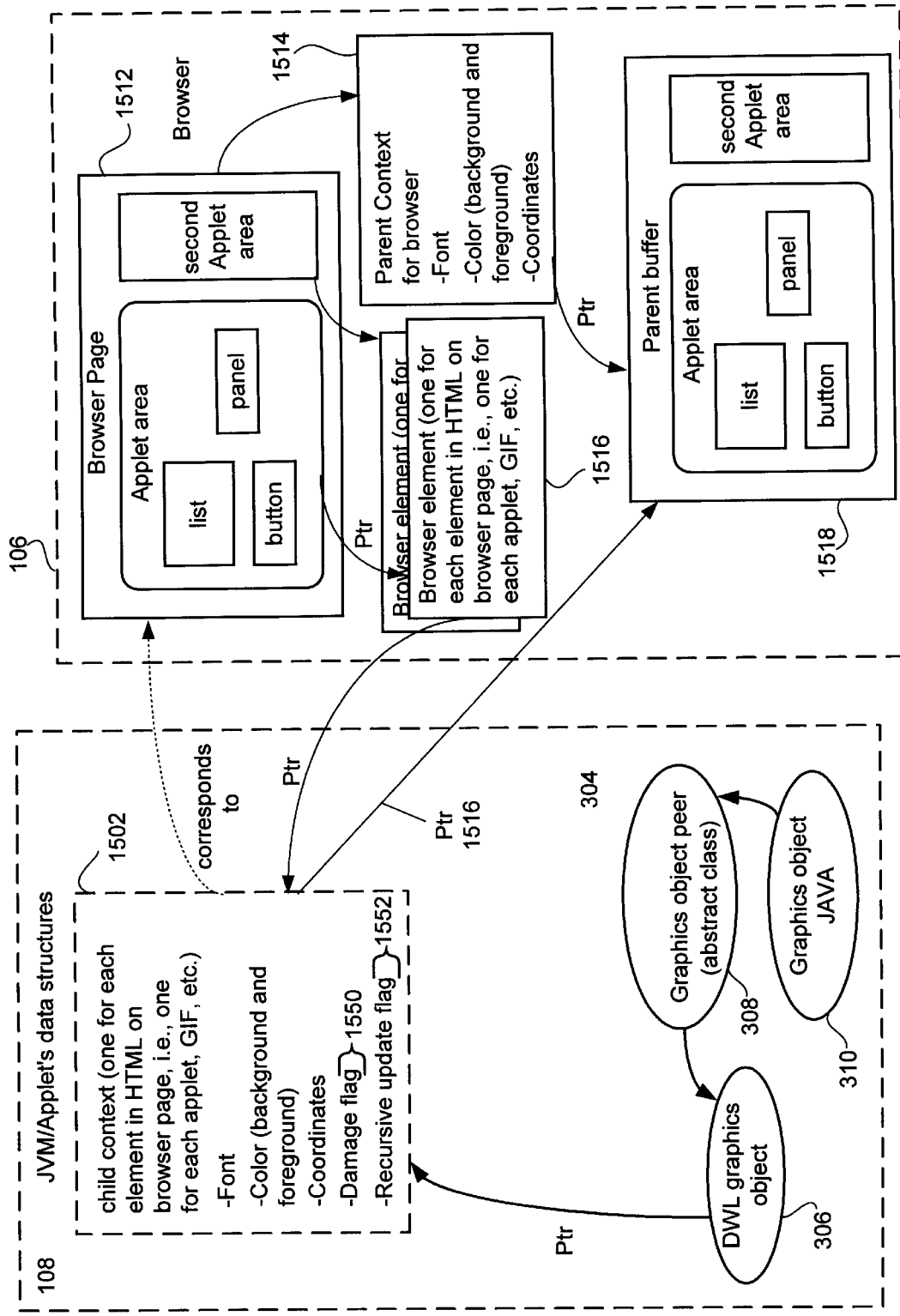
Fig. 3(a) Parent and Child Contexts

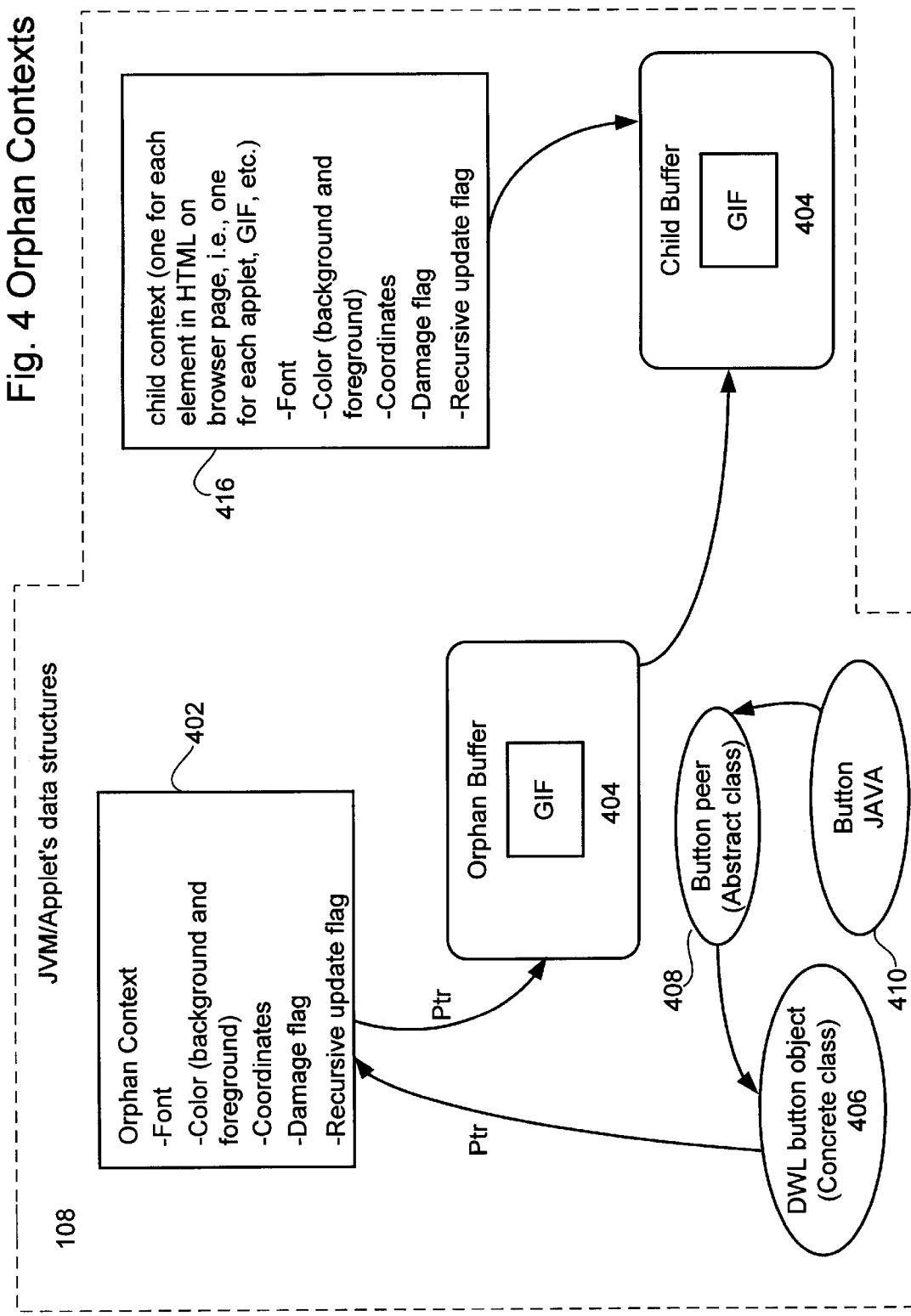
Fig. 4 Orphan Contexts

Main Browser
Loop

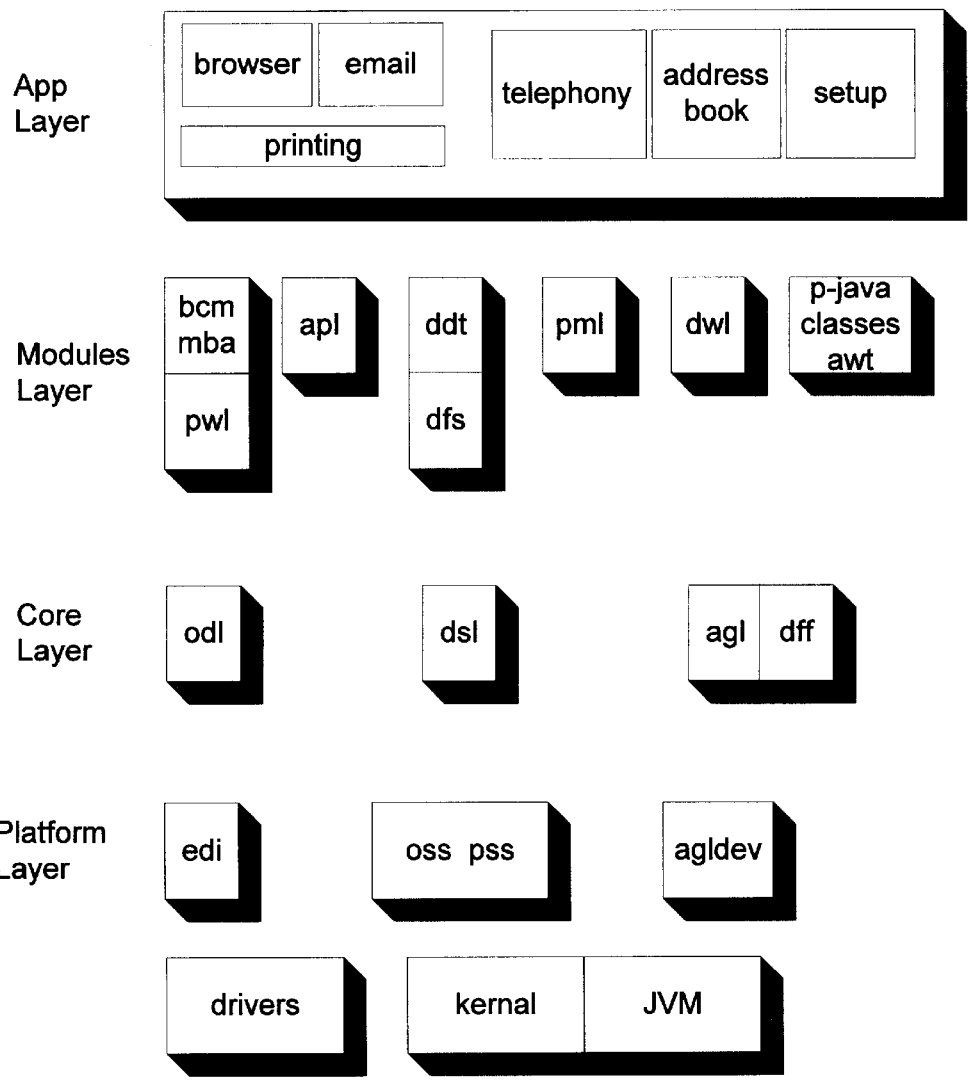

CED Consumer Device Architecture

BCM: Browser Control Module
MBA: Merrimack Browser A
DWL: Developer's Widget Library
ODL: Opaque Device Library
DSL: Developer's System Library
AGL: Applications Graphics Lab
DFL: Developer Font Library
ODI: Opaque Device Implementation
OSS: O S Specific
PSS: Project Specific Services APL: Appliance Printer Library
PML: Programmers Mail Library
DFS: Developer File S
PWL: Programmer's WEB Library

Fig. 11

Graphic for released button

Graphic for pressed button (displayed for 50 milliseconds)

| | GENERAL DESCRIPTION | ARGUMENTS | RETURNS |
|---|---|---|---|
| ag CreateChildContext | Creates a child data structure | parent context – parent context<br>rect – position and size of the child context relative to the parent | valid pointer to create context |
| ag DeleteChildContext | Deletes a child data structure | context – context to be deleted | 0 – operation was immediately effective<br>1 – operation schedules after threads are done with context<br>-1 – failure |
| ag BeginPaint | Tell AGL that it is ready to begin drawing in the context | context – the context to be drawn in | 0 – OK<br>-1 – failure |
| ag EndPaint | Tell AGL that it is ready to be drawn by the screen | context – the child context to be drawn to the screen | 0 – OK<br>-1 – failure |
| ag CreateOrphanContext | Creates an orphan child context, which cannot be drawn directly to the screen. It can only be copies into another child context using algPutContext | width<br>height | valid pointer to create context |
| ag Put Context | Copies a child context to another at the position given by rect | Target context<br>Source context<br>Rect – position on the target where the image is copies from | |
| ag ContextRedrawn | Checks to see if a browser component (such as an applet) needs to be redrawn (i.e., whether damage flag is set) | context – the context to check | TRUE – Applet need to be redrawn<br>FALSE – Applet does not need to be redrawn |

Fig. 14

APPLET AND APPLICATION DISPLAY IN EMBEDDED SYSTEMS USING BUFFERLESS CHILD GRAPHICS CONTEXTS

CROSS REFERENCE TO RELATED APPLICATION

This application is a continuation-in-part of U.S. application Ser. No. 09/203,183 filed Nov. 30, 1998 pending and entitled "Applet and Application Display in Embedded Systems Using Child and Orphan Graphics Contexts" which is hereby incorporated by reference. This application takes priority under 35 U.S.C. §119(e) of U.S. patent application Ser. No. 60/146,448 filed Jul. 30, 1999 naming Rajesh Kanungo, et al. as inventor(s) and assigned to the assignee of the present application which is also incorporated herein by reference for all purposes. This application is also related to the following U.S. patent applications which are herein incorporated by reference:

1) U.S. Pat. No. 6,266,056 filed Nov. 30, 1998 entitled "Display Widget Interaction in Embedded Systems Using Child Graphics Contexts" of Rajesh Kanungo;
2) U.S. patent application Ser. No. 09/203,224 entitled "Method and Apparatus For Modal Dialog Box Management In Applets On Information Appliances" of Rajesh Kanungo and Juan Carlos Soto, Jr.;
3) U.S. patent application Ser. No. 09/201,685 filed Nov. 30, 1998 entitled "TV PIP Applet Using PIP Framework and Implementation" of Rajesh Kanungo; and
4) U.S. patent application Ser. No. 09/203,223 filed Nov. 30, 1998 entitled "TV PIP Using Java API Classes and Java Implementation Classes" of Rajesh Kanungo.

FIELD OF THE INVENTION

This application relates to a method and apparatus for a user interface control and, specifically, to a method and apparatus that allows a user to display graphics without using a complex windowing system.

BACKGROUND OF THE INVENTION

Systems that have embedded programs, such as certain information appliances and consumer products, often do not contain general purpose windowing or window management software. In these systems, all graphics are generally done via calls to the built-in graphics routines, such as draw-line, draw rectangle, etc. In many conventional systems, graphics are drawn via interaction with the browser. Thus, if multiple applets are executing as different threads in the browser, they will experience a lack of concurrency when performing graphics operations.

SUMMARY OF THE INVENTION

A described embodiment of the present invention implements a separate child context for each applet (or similar browser element). A described embodiment of the present invention provides one or more child contexts that correspond to elements in the HTML for a web page displayed by a browser. For example, each applet executed by the browser has a corresponding and separate child context where each child context has a corresponding portion of browser memory mapped thereto. The browser also has a parent context, which each child context points to. When a graphic is displayed via a widget, the widget draws the graphic (such as a panel or a non-pressed button) in the child context of the applet and sets a "damage" flag in the child context. When the browser performs its main browser loop, it checks the status of the damaged flag for each element (including each applet). If the browser finds a damage flag that is set, this means that something was written into that portion of the browser memory mapped to that child context and that the parent buffer needs updating. In this case, the browser "pulls" the information from that portion of memory mapped to the child context and into the parent buffer, which is then used to update the display screen. Thus, several separate threads in the JVM can be executing concurrently and updating graphics elements without interfering with each other.

The invention extends the graphics library routines to include (at least) routines to set up, delete, read, and modify child contexts and to copy information from child contexts to parent contexts. The widget library routines are extended to include (at least) a parameter identifying the context currently being worked on.

Reactive components present special problems. Reactive components are defined as components that must display interactive behavior. For example, when a user clicks on a button on the display screen, the button is momentarily displayed as "pressed" and soon thereafter displayed as "released." Such interactive behavior gives visual feedback to the user. Examples of reactive components include buttons, lists, choice bars, etc. Present special problems. When a widget, for example, a button, needs to show interactive behavior (such as going up and down when pressed), this behavior must occur very rapidly—often too rapidly to necessarily be picked up by a main browser loop, which executes relatively infrequently. For example, in the described embodiment, the main browser loop executes approximately every 200 milliseconds (i.e., approximately five times per second). In contrast, a "down" button press followed by an "up" takes approximately 50 milliseconds. If the system were to wait for the browser loop, the button press would have to last much longer.

In accordance with the purpose of the invention, as embodied and broadly described herein, the invention relates to a method of controlling display of graphics data, comprising: sending a user input event, by a browser to a virtual execution environment; providing, in the virtual execution environment, a child context corresponding to a parent context in the browser and an applet that is executed by the browser; writing directly into a portion of a browser memory associated with the child context, a graphic in accordance with the user input event; pulling, by the browser, the graphic from the portion of a browser memory associated with the child context to the parent context; and displaying the graphic stored in the parent context on a display screen.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 shows an example of a set top box system, including a remote unit, and a video display.

FIG. 3(a) is a block diagram of parent and child context data structures in accordance with an embodiment of the present invention.

FIG. 4 is a block diagram of an orphan data structure in accordance with an embodiment of the present invention.

FIG. 11 is a diagram of the architecture of one embodiment of the present invention.

FIG. 14 shows exemplary routines used to implement child and orphan contexts in an embodiment of the present invention.

DETAILED DESCRIPTION OF PREFERRED EMBODIMENTS

I. General Discussion

Many conventional World Wide Web browsers are capable of executing Java applets. A Java applet is a computer program written in the Java programming language that is designed to execute within a World Wide Web browser. Such applets are often started when a user clicks on a button or link in a displayed Web page. Once started, an applet executes inside the browser, performing whatever tasks it has been programmed to perform. "Java" is a trademark of Sun Microsystems, Inc. in the United States and other countries.

Figure 1A:
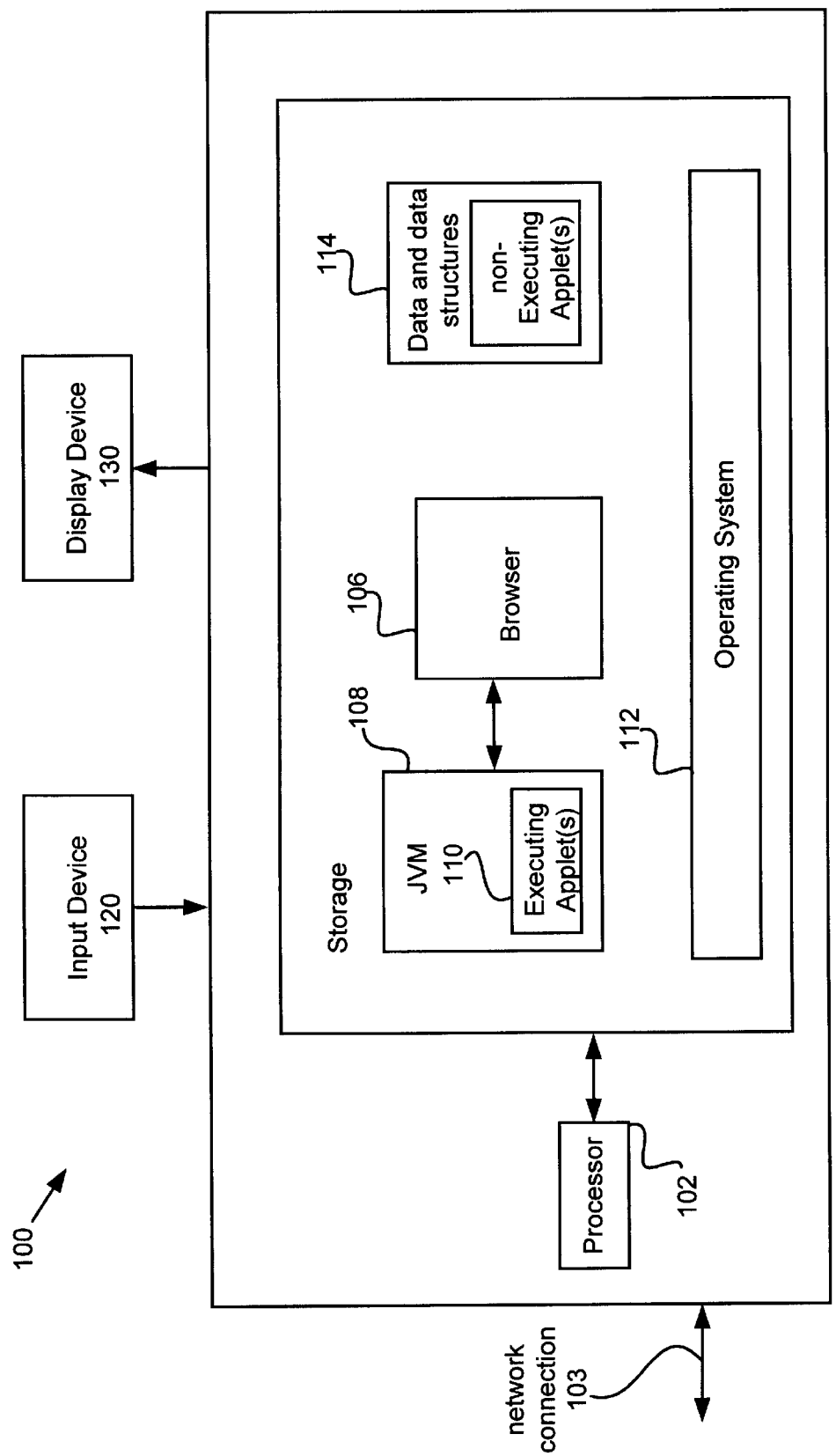
FIG. 1(a) is a block diagram of a data processing system in accordance with one embodiment of the present invention.

FIG. 1(a) is a block diagram of a data processing system 100 in accordance with one embodiment of the present invention. Data processing system 100 can be, for example, a set top box 101 connected to a display device 130, such as, for example, a television set or some other appropriate display device. Data processing system 100 can also be, for example, any other appropriate data processing system.

System 100 includes a processor 102 and a data storage area (e.g., a memory) 104. Data storage area 104 includes certain well-known types of information, such as operating systems 112 and data and data structures 114. In the embodiment shown, data and data structures 114 include, for example, web pages capable of being displayed by a browser 106. Data and data structures 114 can also include, for example, applet software capable of being executed by a Java virtual machine (JVM) 108. Storage area 104 preferably also includes software (not shown) for communicating with a network connection 103, which can be a LAN, WAN, intranet, or the internet.

A person of ordinary skill in the art will understand that system 100 may also contain additional elements, such as input/output lines; additional or second input devices, such as a keyboard, a mouse, and a voice input device; and display devices, such as a display terminal. System 100 may also include a computer readable input device (not shown), such as a floppy disk drive, CD ROM reader, a chip connector, a chip connector, or a DVD reader, that reads computer instructions stored on a computer readable medium, such as a floppy disk, a CD ROM, a memory chip, or a DVD disk. System 100 also may include application programs, operating systems, data, etc., which are not shown in the figure for the sake of clarity.

In the following discussion, it will be understood that the steps of methods and flow charts discussed herein can be performed by processor 102 (or another appropriate processor) executing instructions stored in storage area 104 (or other appropriate memories or storage areas). It will also be understood that the invention is not limited to any particular implementation or programming technique and that the invention may be implemented using any appropriate techniques for implementing the functionality described herein. The invention is not limited to any particular programming language or operating system.

The instructions in storage area 104 may be read into storage area 104 from a computer-readable medium (not shown). Execution of sequences of instructions contained in main memory causes processor 102 (or a similar processor) to perform the processes described herein. In alternative embodiments, hard-wired circuitry may be used in place of or in combination with software instructions to implement the invention. Thus, embodiments of the invention are not limited to any specific combination of hardware circuitry and software.

Figure 1B:
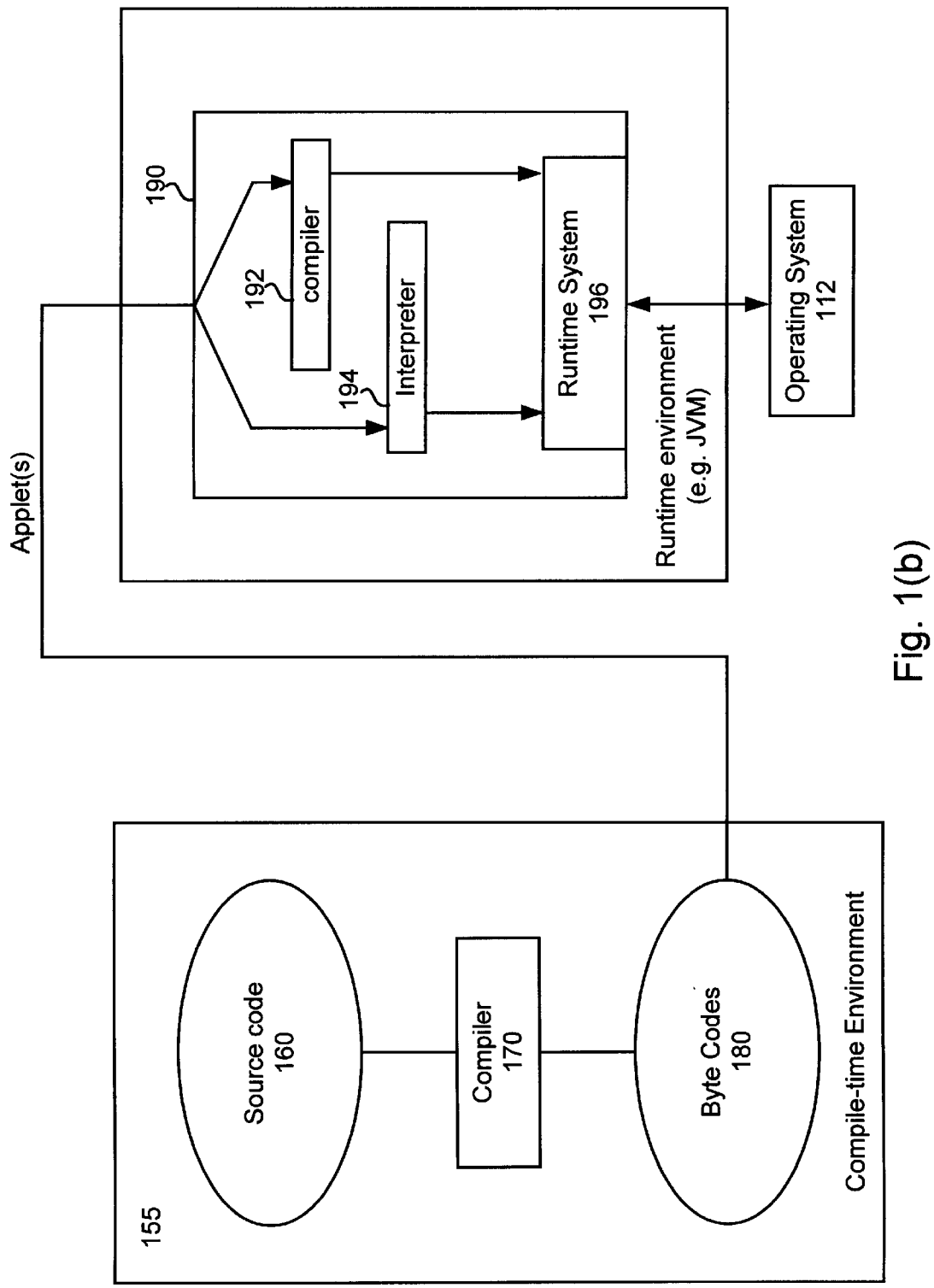
FIG. 1(b) is a block diagram of a data processing system in accordance with one embodiment of the present invention.

FIG. 1(a) shows a virtual machine (such as a Java virtual machine) 108 executing on system 100. FIG. 1(b) is a block diagram of a virtual machine that is supported by system 100 of FIG. 1(a), and is suitable for implementing the present invention. When a computer program, e.g., a computer program written in the Java programming language, is executed, source code 160 is provided to a compiler 170 within compiletime environment 155. Compiler 170 translates source code 160 into bytecodes 180. In general, source code 160 is translated into bytecodes 180 at the time source code 160 is created by a software developer.

Bytecodes 180 may generally be reproduced, downloaded, or otherwise distributed through a network, e.g., network 103 of FIG. 1(a), or stored on a storage device such as primary storage 104 of FIG. 1(a). In the described embodiment, bytecodes 180 are platform independent. That is, bytecodes 180 may be executed on substantially any computer system that is running on a suitable virtual machine.

Bytecodes 180 are provided to a runtime environment 108, which includes virtual machine 190. Runtime environment 108 may generally be executed using a processor or processors such as processor 102 of FIG. 1(a). Virtual machine 190 includes a compiler 192, an interpreter 194, and a runtime system 196. Bytecodes 180 may be provided either to compiler 192 or to interpreter 194.

When bytecodes 180 are provided to compiler 192, methods contained in bytecodes 180 are compiled into machine instructions. In one embodiment, compiler 192 is a just-in-time compiler, which delays the compilation of methods contained in bytecodes 180 until the methods are about to be executed. When bytecodes 180 are provided to interpreter 194, bytecodes 180 are read into interpreter 194 one bytecode at a time. Interpreter 194 then performs the operation defined by each bytecode as each bytecode is read into interpreter 194. That is, interpreter 194 "interprets" bytecodes 180, as will be appreciated by those skilled in the art.

When a method is invoked by another method, or is invoked from runtime environment 108, if the method is interpreted, runtime system 196 may obtain the method from runtime environment 108 in the form of sequences of bytecodes 180, which may be directly executed by interpreter 194. If, on the other hand, the method that is invoked is a compiled method that has not been compiled, runtime system 108 also obtains the method from runtime environment 108 in the form of a sequence of bytecodes 108, which then may go to activate compiler 192. Compiler 194 then generates machine instructions from bytecodes 180, and the resulting machine-language instructions may be executed directly by processor 102 (or other appropriate processors). In general, the machine-language instructions are discarded when virtual machine 109 terminates. The operation of virtual machines or, more particularly, Java virtual machines, is described in more detail in *The Java Virtual Machine Specification* byTime Lindholm and Frank Yellin (ISBN 0-201-63452-X), which is incorporated herein by reference.

FIG. 2 shows an example of a set top box system, including a set top box 101 connected to a television 130 and a remote unit 120. Remote unit 120, which is used as an input device, is not shown to scale. An actual remote unit is generally of a size appropriate to fit in a user's hand. Similarly, set top box 101 and television 120 are not necessarily shown to scale. Certain embodiments of the present invention can also be used with a keyboard or with an infrared or other wireless keyboard (not shown).

It will be understood that the button arrangement shown on remote unit 120 are for purposes of example only and are not to be interpreted in a limiting sense. Remote unit 120 includes a "web" button, a "mail button, a "home" button, a "goto" button, a "fave" button, a "back" button, a "control" button, arrow buttons, and a "select" button. As will be appreciated, a conventional use of back button is to display a previously displayed web page. Similarly, a conventional use of "goto" button is to allow the user to specify and view a new web page. The arrow buttons allow the user to move a cursor between various elements on web page 304, as is known to persons skilled in the art.

In FIG. 2, a button 204, a list and a panel are displayed on a web page displayed on display device 130. It will be understood that these elements 304 are generated on a web page under control of an applet (not shown), such as applet 110 of FIG. 1(*a*).

Network connection 103 allows the set top box to communicate with a network, such as the internet, an intranet, a LAN or a WAN. Network connection can also be a wireless link.

Video line 207 provides a source of video input to set top box 101. Line 206 couples the set top box 101 to the display device 130 to convey video and audio output signals to the display device 130. The signals on line 206 could be, for example, one or more of, S-video signals, composite signals, component signals, or audio signals, or HDTV signals.

II. Detailed Discussion

Figure 3B:
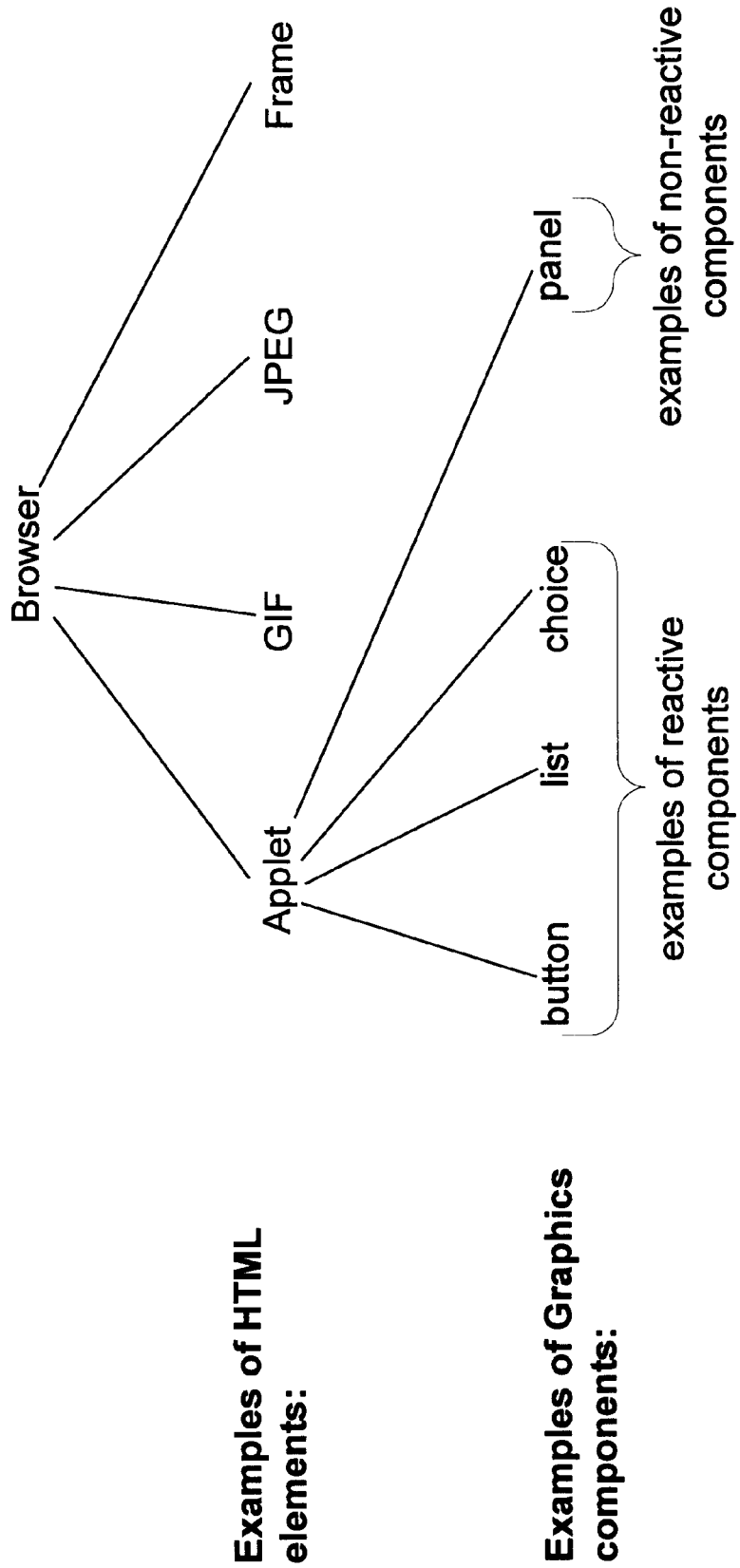
FIG. 3(b) is a diagram showing the relationships between a browser, exemplary browser elements, and exemplary components of a specific browser element.

FIG. 3(*a*) is a block diagram of parent and child context data structures in accordance with an embodiment of the present invention. In FIG. 3(*a*), a browser page memory 312 includes memory for a first applet area (which contains a list, a button, and a panel) and a second applet area (contents not shown). The browser memory includes a pointer to a parent context data structure 302 for the browser, which includes information about the browser, such as font, foreground and background color information, and screen coordinates of the browser. The parent context 314 has an associated parent memory buffer 318, which includes visual representations of the screen memory for the browser.

Each element in the HTML for a page currently being displayed by the browser has an associated browser element 316. Thus, in the example, each of the first applet and the second applet have an associated browser element 316. Other types of elements that may have an associated browser element include GIFs, JPEGs, etc.

Each browser element points to a child context 302 in the JVM. Only one child context 302 is shown in the figure for the sake of clarity, but in the described embodiment, each browser element (and therefore each applet) has an associated child context. The child context 302 includes information about its associated applet, such as font, foreground and background color information, and screen coordinates of information displayed by the applet. The child context of an applet also includes a damage flag 350, which indicates whether the contents of the child buffer have been changed (akin to a "dirty bit") and a Recursive Update flag 352, which indicates whether the applet contains a reactive element, such as a button, list, or choice. The child context 314 has an associated child memory buffer 304, which includes visual representations of the screen memory for the browser.

The described embodiment does not use a graphics system such as an X Server or Motif. Instead, it uses direct graphic routines implemented along with child and parent contexts. These direct graphics routines write directly into the graphics buffers of the parent and/or child contexts. A graphics Java object 310 points to a graphics peer object 308, which is an abstract class. A DWL (developer's widget library) object is a subclass of class 308. An example of the DWL graphics object could be a button widget. The DWL graphics object points to the child context 302 for the applet that contains the object.

Figure 6:
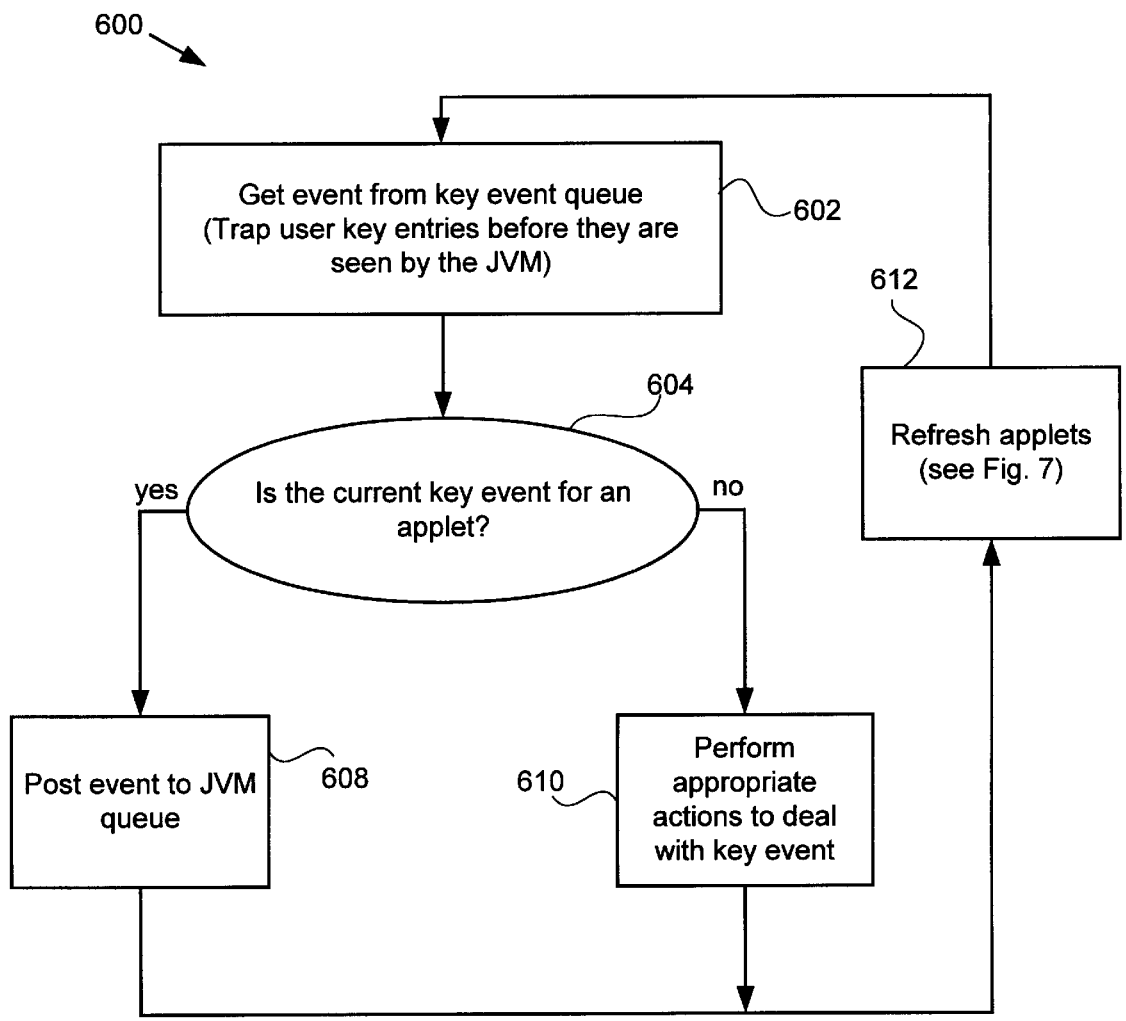
FIG. 6 is a flowchart showing details of the main browser loop, including refreshing the applets.

It is important to note that each Java applet executes as one or more separate threads in the JVM. Thus, each Java applet can modify its child context 302 and its child memory independently from the other applets. As shown in FIG. 6, a main browser loop periodically polls the executing applets to determine whether any of their damage flags are set.

FIG. 3(*b*) is a diagram showing the relationships between a browser, exemplary browser elements, and exemplary components of a specific browser element. A browser displays HTML elements such as applets, GIFs, JPEGs and frames. Certain elements, such as applets can include graphics components such as buttons, lists, choices, or panels. As shown, certain elements such as buttons, lists, and choices are examples of reactive components that require an interactive output when they are pressed or selected by the user. In contrast, panels generally do not require any external indication that the user has used them.

Figure 13:
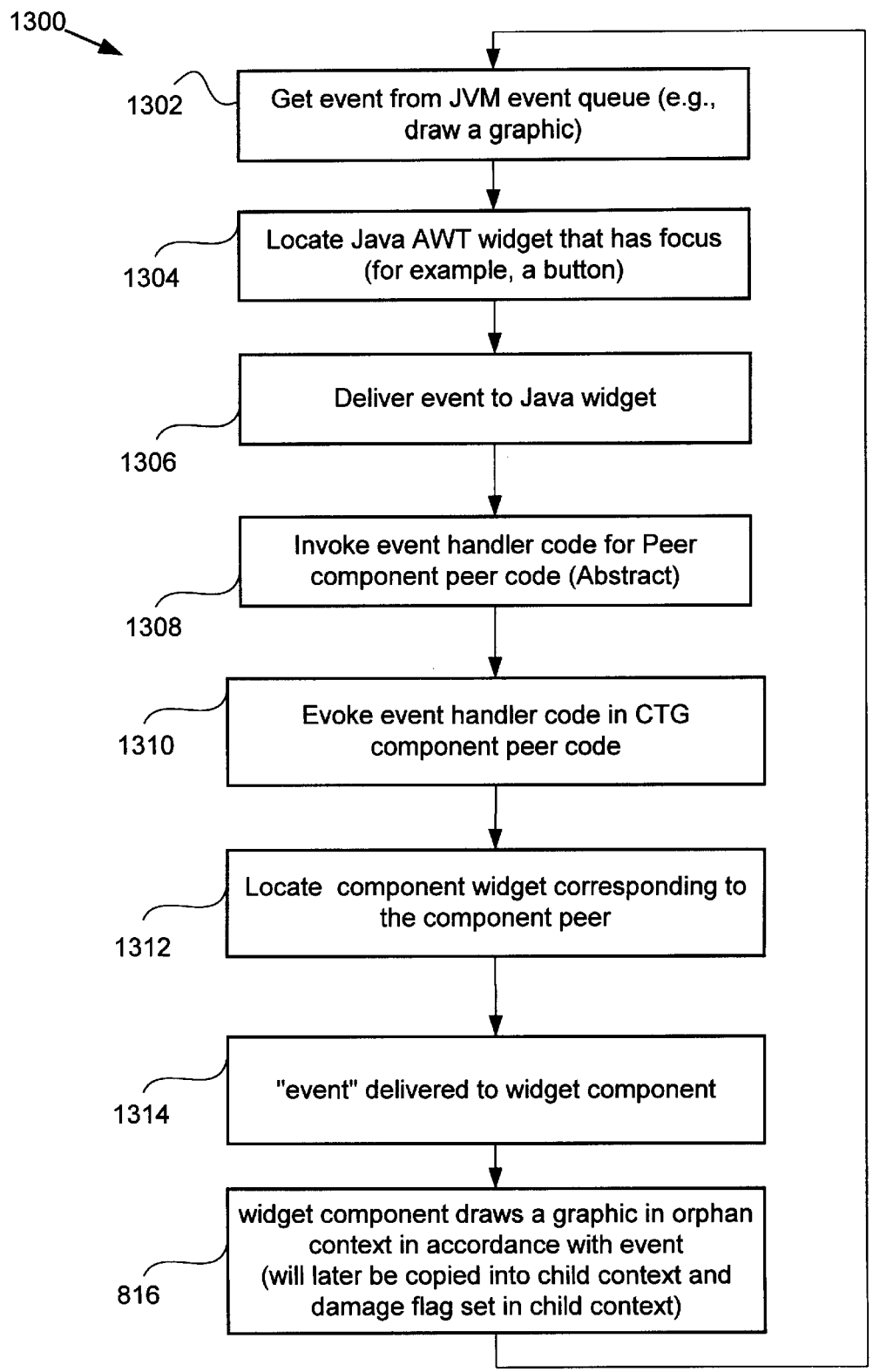
FIG. 13 is a flow chart for orphan context.

FIG. 4 is a block diagram of an orphan data structure in accordance with an embodiment of the present invention. Orphan contexts are used in situations where some "behind the scenes" drawing needs tot be done. An orphan context is similar to a child context (and can be a special case of a child context) but is not associated with any particular applet or other element. Instead, as shown in FIG. 13, the content of an orphan context is transferred to a child buffer and the damage flag of the child buffer is set so that the main browser loop will eventually pick up the graphics change. Orphan contexts cannot be drawn directly on the screen. They can only be copied to another context (such as a child context).

Figure 5:
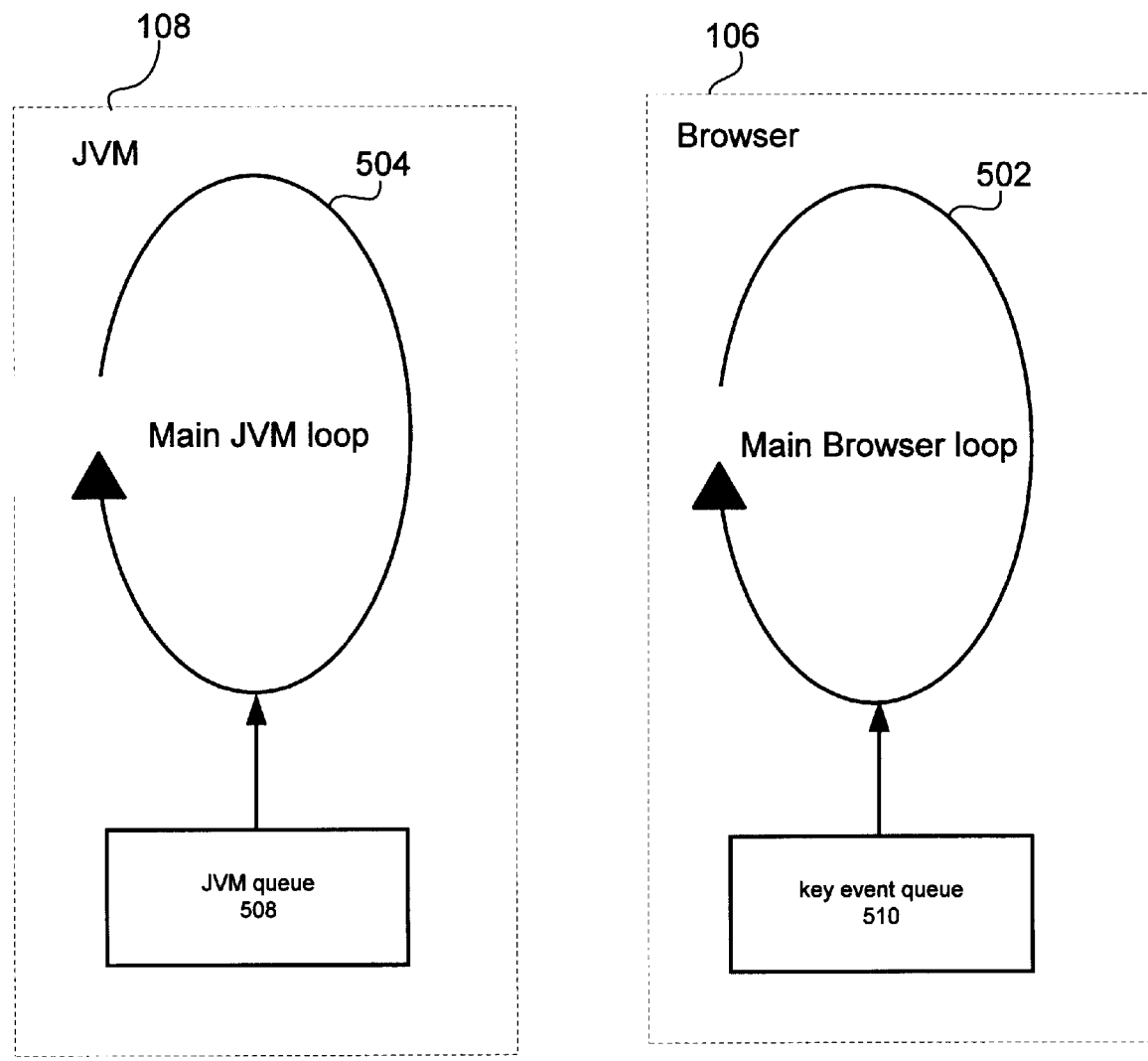
FIG. 5 is a block diagram showing a main browser loop and a JVM loop.

FIG. 5 is a block diagram showing a main browser loop and a JVM loop. As is shown in the Figure, these loops include a main browser loop (which is performed by browser 106 of FIG. 1). A main JVM loop 504 is performed by JVM 108. A key event queue 510 receives "key events," for example, key presses from remote unit 206 and queues them for input to main browser loop 502. A JVM queue 508 receives "JVM events," from the main browser loop and queues them for input to main JVM loop 504. In the described embodiment, each of loops 502 and 506 are implemented as a thread executed by processor 102.

Figure 7:
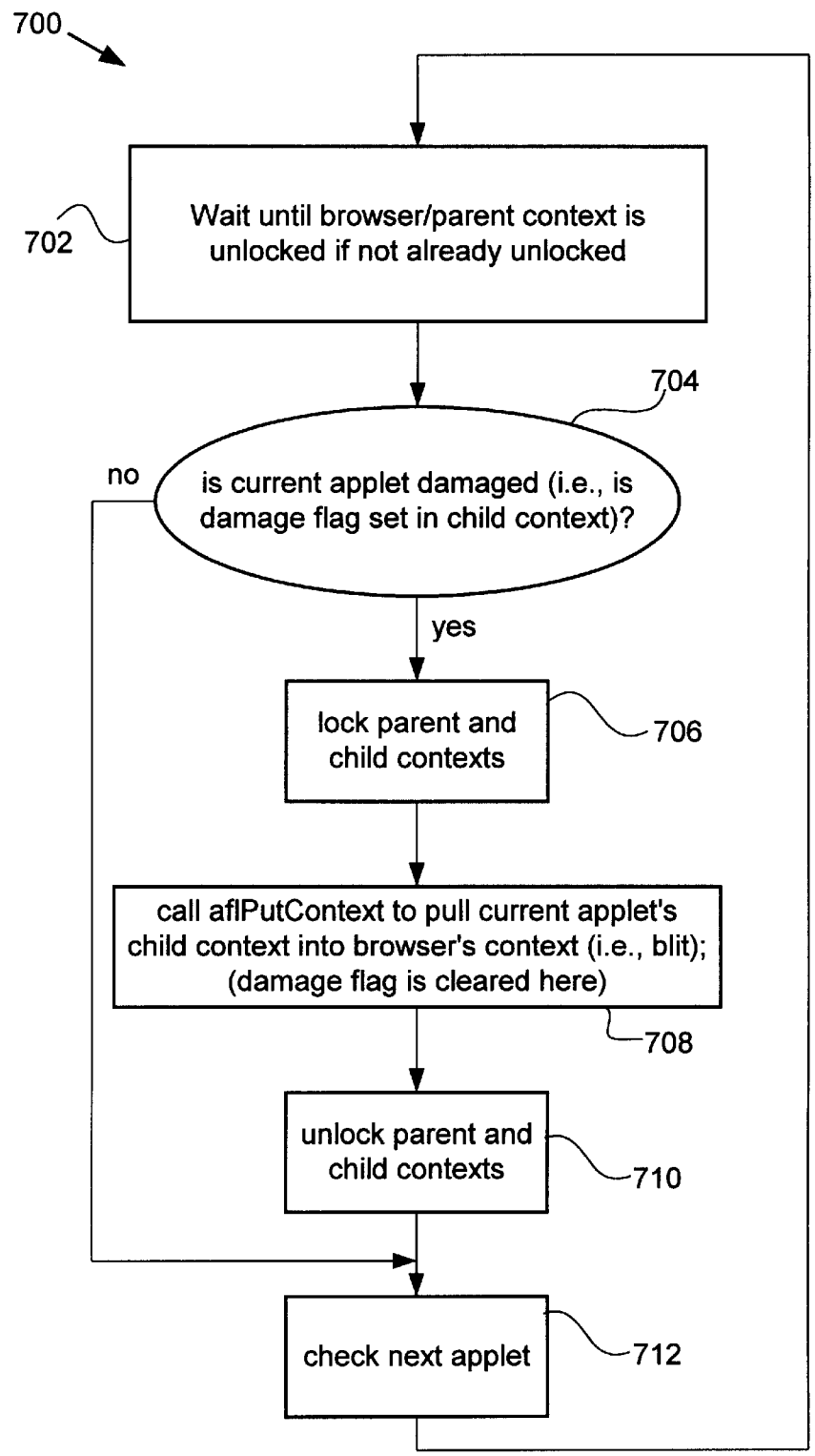
FIG. 7 is a flow chart showing details of refreshing the applets in the main browser loop.

FIG. 6 is a flowchart showing details of the main browser loop, including periodic refreshing of executing applets. In step 602, the main loop receives a key press from a key event queue. A key press can be the result of the user pressing a key on the remote 120 or the result of clicking or selecting a button or similar component displayed on the screen by an applet. If in step 602, the current key event is an event for an applet, an event is placed on the JVM queue 508 via step 608. Otherwise, an appropriate activity is performed for the key event. In either case, the main browser loop refreshes the graphics display of any executing applets, as shown in FIG. 7. (It will be appreciated that other activities occur in the main browser loop, but have been omitted from the description for the sake of clarity).

FIG. 7 is a flow chart showing details of refreshing the applets in the main browser loop. In an initial step 702, control waits until the parent context is unlocked. In some situations, the parent context will already be unlocked. Locking of the parent context occurs when some other thread needs to access the parent context or wants to keep the parent context from being accessed. In the described embodiment, this lock is implemented as a unix mutex lock. One example of how the parent might become locked is shown in step 1002 of FIG. 10.

The steps of FIG. 7 loop through the active applets to determine whether its damage flag is set. If, in step 704, the damage flag of a current applet is set, control passes to step 706. Otherwise, control passes to step 712. In step 706, the browser locks the parent and child contexts (so not other threads can change them during steps 708–710). In step 708, the browser "pulls" graphics data from the child context 302 and child memory 304 of the applet to the parent context 314 and parent memory 318 of the browser. In the described embodiment, this step is performed via a call to a routine called agIPutContext, which is described in connection with FIG. 14.

Figure 8:
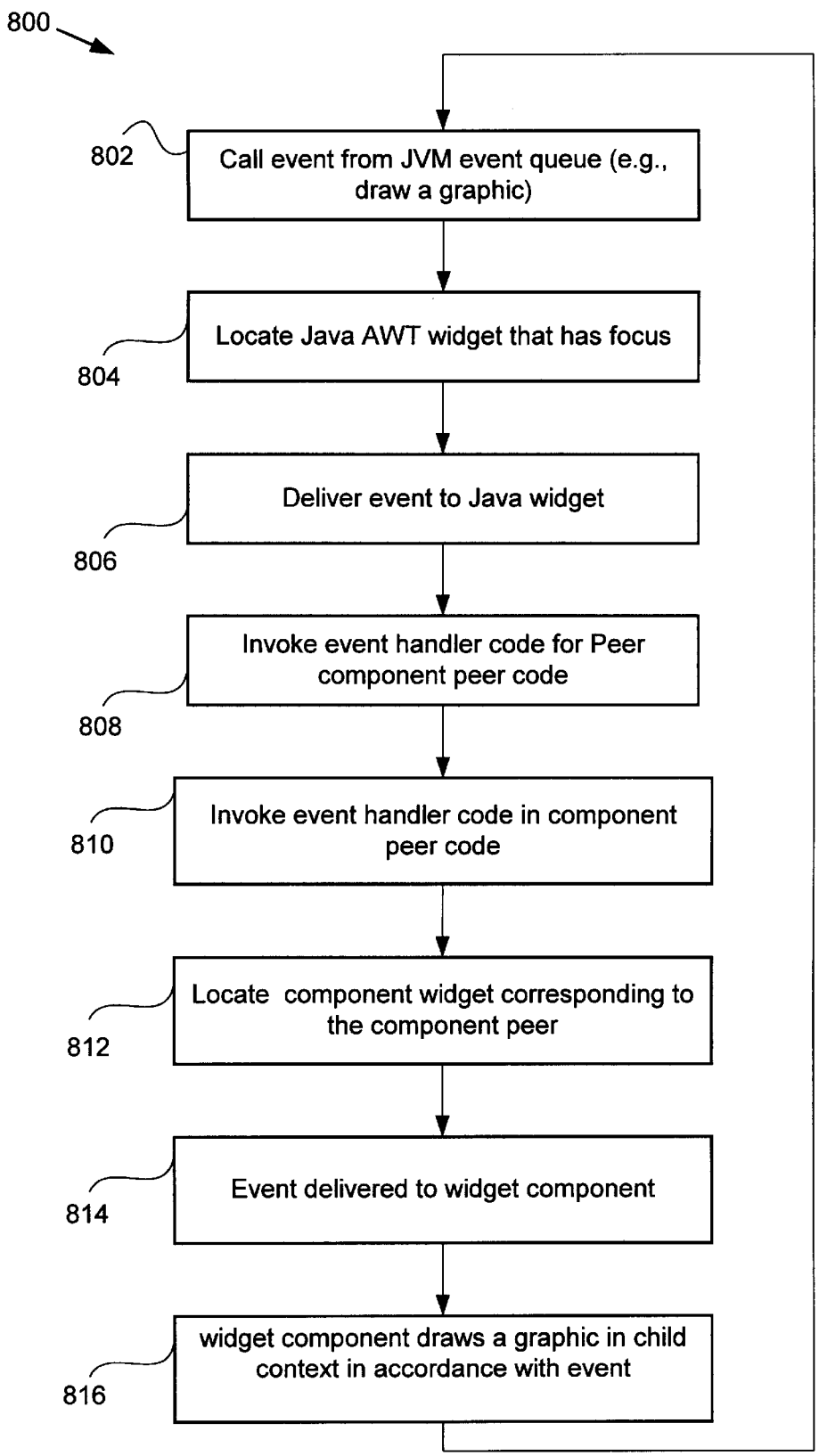
FIG. 8 is a flow chart showing a main JVM loop for regular non-reactive components.

FIG. 8 is a flow chart showing a main JVM loop for regular non-reactive components, such as a panel, or other display element that does not require an interactive behavior. In the described embodiment, the steps of FIG. 8 are performed by the JVM 108. In step 802, the JVM receives an event from the JVM event queue. Events in this queue can be sent from the browser or from some other source. An example of such a non-reactive event might be "draw a panel." Steps 804–812 locate a Java AWT widget that has focus (i.e., that has been chosen to receive the input from remote 120 or a similar keyboard). The event is delivered to a Java widget, which invokes the abstract event handler code and the actual component code for the peer. Step 812 locates the DWL component widget corresponding to the peer, and, in step 814, the event is delivered to the DWL (Developer's widget library) component (see FIG. 14). In step 816, the DWL component draws the graphic in the child buffer in accordance with the event. This step is described in more detail in FIG. 10, which describes a method used for both reactive and non-reactive components.

Figure 9:
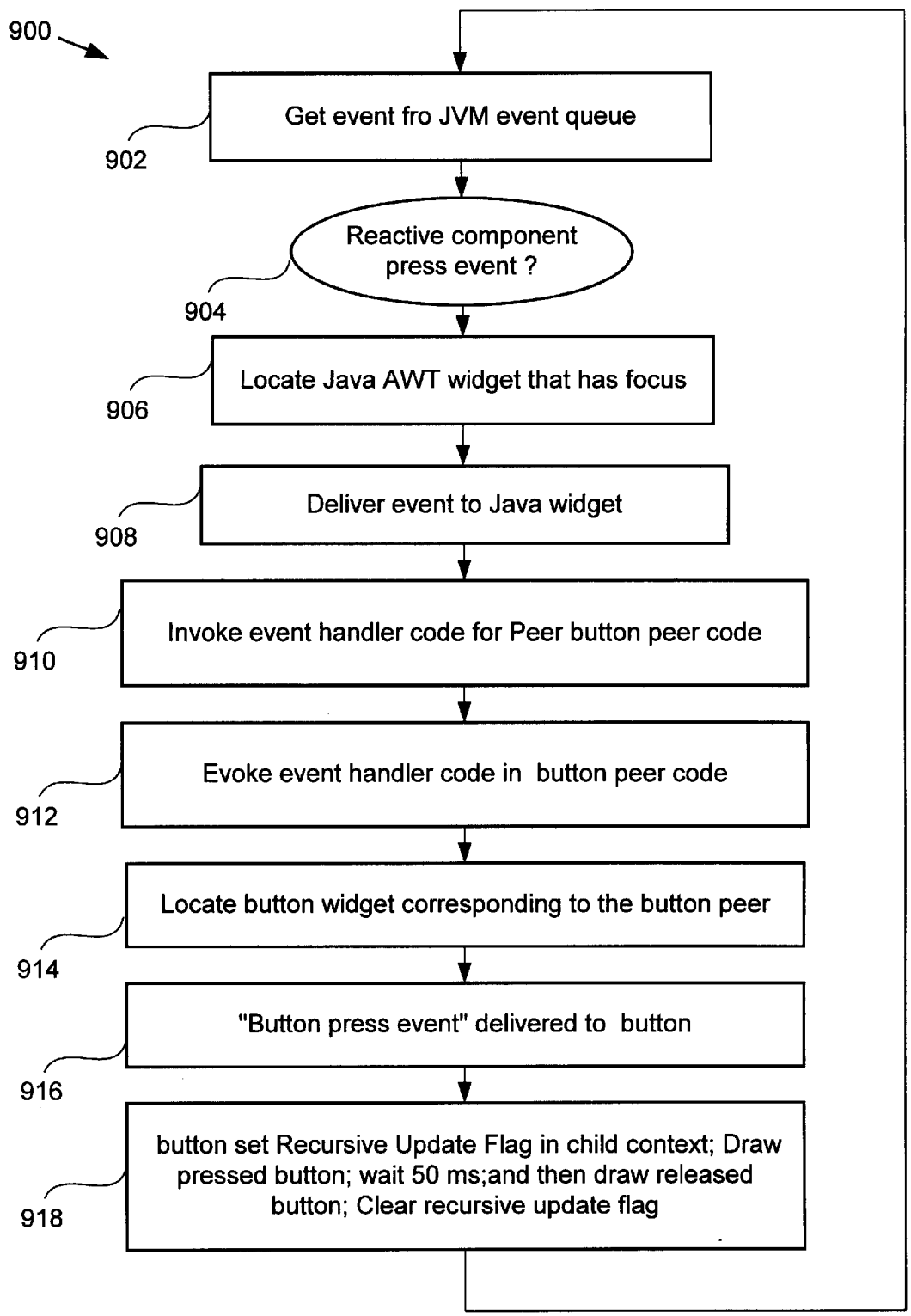
FIG. 9 is a flow chart showing a main JVM loop for reactive components, such as a button press.

FIG. 9 is a flow chart showing a main JVM loop for reactive components, such as a button press. As discussed above, a reactive component cannot wait for the main browser loop. In the described embodiment, the main browser loop of FIG. 7 executes every 200 milliseconds. Similarly, the described reactive events, such as a button press are required to take place in approximately 50 milliseconds. The steps of FIG. 9 are similar to those of FIG. 8, except that, in step 918, the JVM twice writes directly into the child and the parent contexts. Thus, the JVM directly writes the "pressed" button graphic and the "released" button graphic without waiting for the main browser loop. Step 918 sets the Recursive Update flag, draws two graphics images into the child and parent buffers, and clears the Recursive Update flag. This is described in more detail in connection with FIG. 10.

Figure 10:
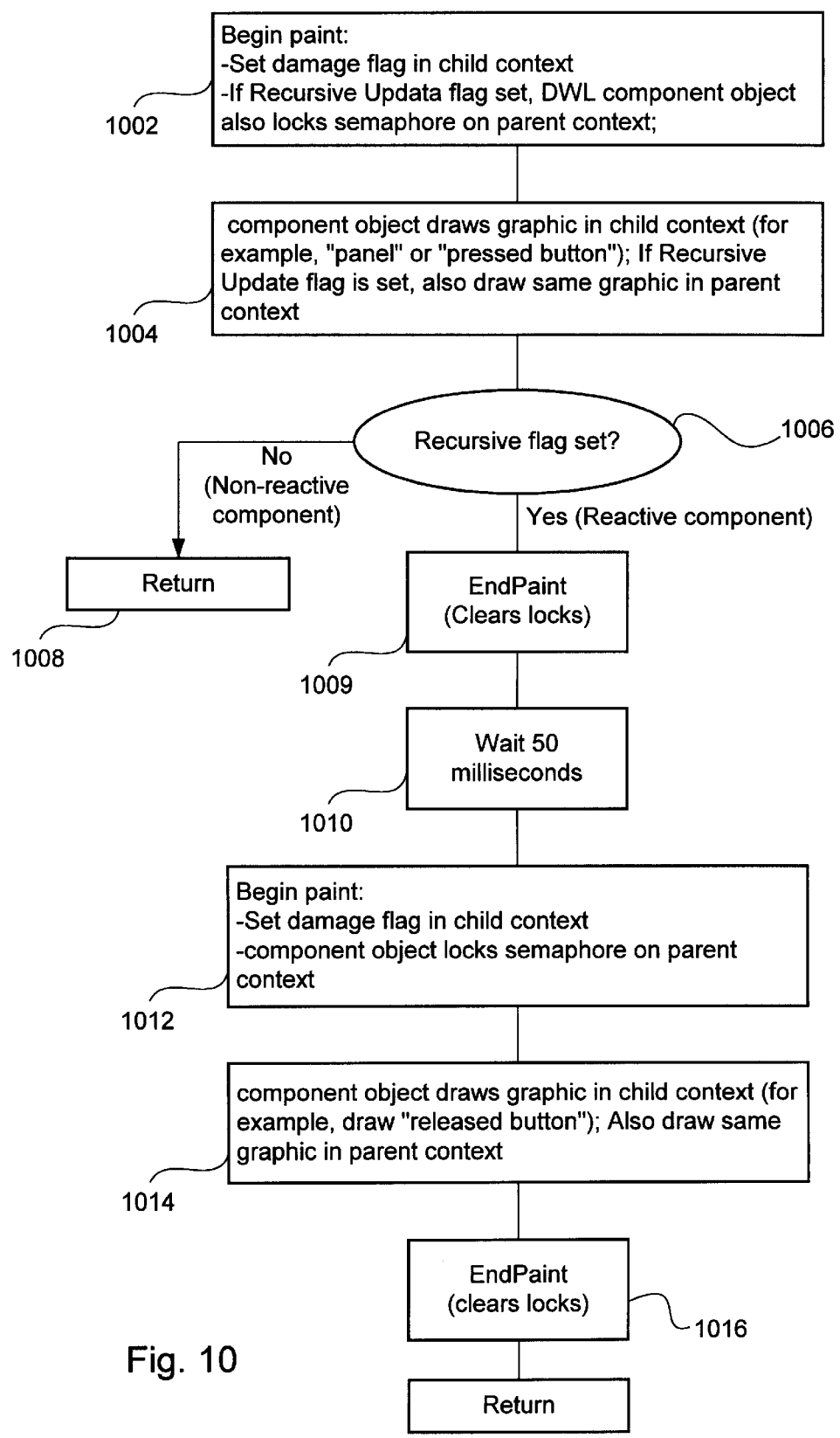
FIG. 10 shows further details of FIGS. 8 and 9.

FIG. 10 shows further details of FIGS. 8 and 9. If the method of FIG. 10 is called from FIG. 8 (a non-reactive component), the Recursive Update flag will not be set. If, on the other hand, the method of FIG. 10 is called from FIG. 9 (a reactive component), the Recursive Update flag will have been set in step 918.

Thus, for a non-reactive component, in step 1002 the widget issues a call (such as, for example, an agIBeginPaint call shown in FIG. 14), which sets the damage flag in the child context. Because the recursive update flag is not set, control passes to step 1004. In step 1004, the DWL component object draws a graphics for the received JVM event in the child buffer. Because the recursive update flag is not set, control passes to step 1006 and then to step 1008. Thus, for a non-reactive component, the component object draws the correct graphic in the child buffer and sets the damage flag in the child context. The change in graphics will be picked up in the main browser loop as shown in FIG. 7.

For a reactive component, in step 1002 the widget issues an agIBeginPaint call (see FIG. 14), which sets the damage flag in the child context (even though this is not required, it is harmless). Because the recursive update flag is set, a lock is also placed on the parent context and buffer and on the child context and buffer. Such a lock means that only the locking thread can change the contexts until they are unlocked. Control passes to step 1004. In step 1004, the DWL component object draws a first graphic for the received JVM event in the child buffer (such as a "pressed" button shown in FIG. 12(a)). Because the recursive update flag is set, the DWL component object also draws the graphics for the received JVM event in the parent buffer. Thus, the change to the parent buffer will automatically be reflected on the display screen without having to wait for the main browser loop. Control passes to step 1006 and then to step 1009, which clears the locks. Step 1010 waits some approximate time, such as 50 milliseconds, which is long enough for a human user to notice that the button appearance has changed.

Figure 12B:
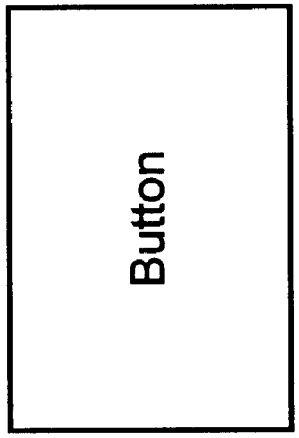
FIGS. 12(a) and 12(b) are diagrams of, respectively, a pressed button and a released button.
Figure 12A:
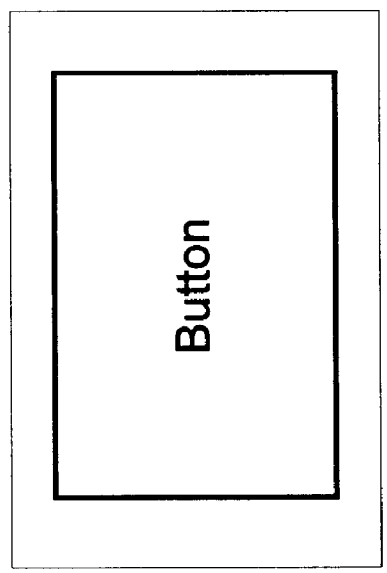

Steps 1012–1016 perform similar steps to draw a second graphic (such as a "released" button shown in FIG. 12(b)) directly into the parent and child buffers and contexts. Thus, for a reactive component, the component object draws a first graphic in the child and parent buffers, waits some predetermined period of time, and draws a second graphics in the parent and child buffers. Reactive graphics do not wait for the change in graphics will be picked up in the main browser loop as shown in FIG. 7. If the main browser loop occasionally happens to redraw the second graphic, no harm is done.

FIG. 11 is a diagram of the architecture of one embodiment of the present invention. It includes the extended AGL and DWL routines mentioned above.

FIG. 13 is a flow chart for orphan context. The steps are similar to those of FIG. 8, but in step 1316, the orphan context must be copied to a child context (or a parent context, not shown) where it will eventually be displayed. Orphan context are used, for example, when there is a need to draw a graphic "offscreen," such as sometimes occurs for JPEGs and GIFs. Similarly, if a graphic will be duplicated once it is drawn, it is often advantageous to use an orphan context.

FIG. 14 shows exemplary AGL routines used to implement child and orphan contexts in an embodiment of the present invention. These routines include but are not limited to: aglCreateChildContext, aglDeleteChildContext, aglBeginPaint, aglEndPaint, aglCreateOrphanContext, aglPutContext, and aglContextRedrawn.

Figure 15:
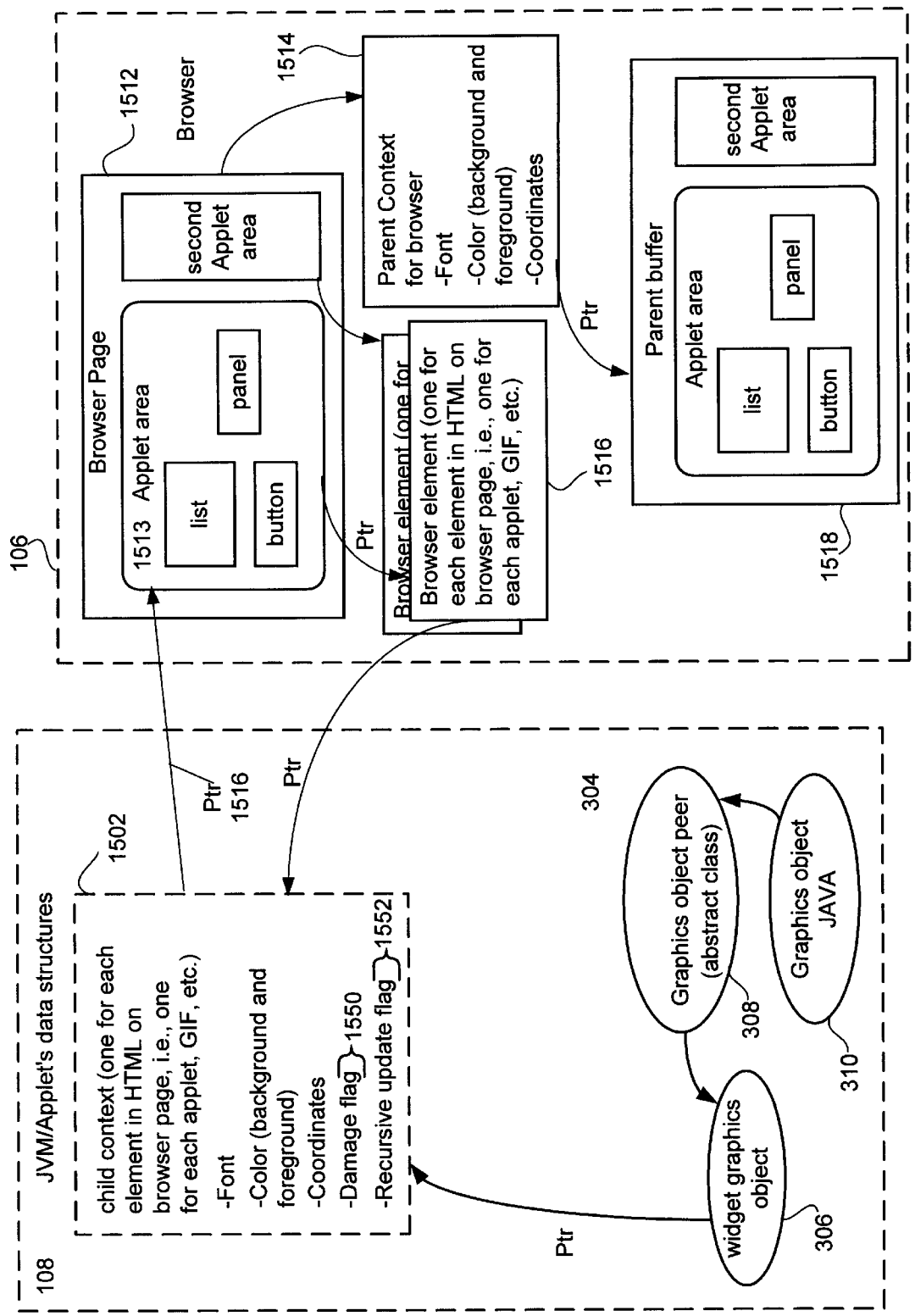
FIG. 15 is a block diagram of parent and a bufferless child context data structures in accordance with another embodiment of the present invention.

In another embodiment of the invention, a bufferless child context can be employed as shown in FIG. 15 that illustrates a block diagram of parent and child context data structures. In FIG. 15, a browser page memory 1512 includes a portion of memory 1513 for a first applet area (which contains a list, a button, and a panel) and a second applet area (contents not shown). The browser page memory 1512 includes a pointer 1515 to aparent context data structure 1514 for the browser 106, which includes information about the browser, such as font, foreground and background color information, and screen coordinates of the browser. The parent context 1514 has an associated parent memory buffer 1518, which includes visual representations of the screen memory for the browser.

Each element in the HTML for a page currently being displayed by the browser has an associated browser element 1516. Thus, in the example, each of the first applet and the second applet has an associated browser element 1516. Other types of elements that may have an associated browser element include GIFs, JPEGs, etc.

Each browser element points to a child context 1502 in the JVM. Only one child context 1502 is shown in the figure for the sake of clarity, but in the described embodiment, each browser element (and therefore each applet) has an associated child context. The child context 1502 includes information about its associated applet, such as font, foreground and background color information, and screen coordinates of information displayed by the applet. The child context 1502 of an applet also includes a damage flag 1550, which indicates whether the contents of the child buffer have been changed (akin to a "dirty bit) and a Recursive Update flag 1552, which indicates whether the applet contains a reactive element, such as a button, list, or choice. It is important to note that in this particular embodiment of the invention, the child context 1502 does not have an associated child memory buffer but includes, instead, a pointer 1517 to the portion 1513 of the browser page memory buffer 1512. In this way, the performance of the browser is appreciably enhanced due to the fact that visual representations of the screen memory for the browser heretofore stored in the child buffer 304 are stored directly in the portion 1513 of the browser memory 1512, which when needed, is pulled directly to the parent memory buffer 1518.

It is important to note that each Java applet executes as one or more separate threads in the JVM. Thus, each Java applet can modify its child context 1502 and its corresponding portion of parent buffer memory 1513 independently from the other applets.

Figure 16:
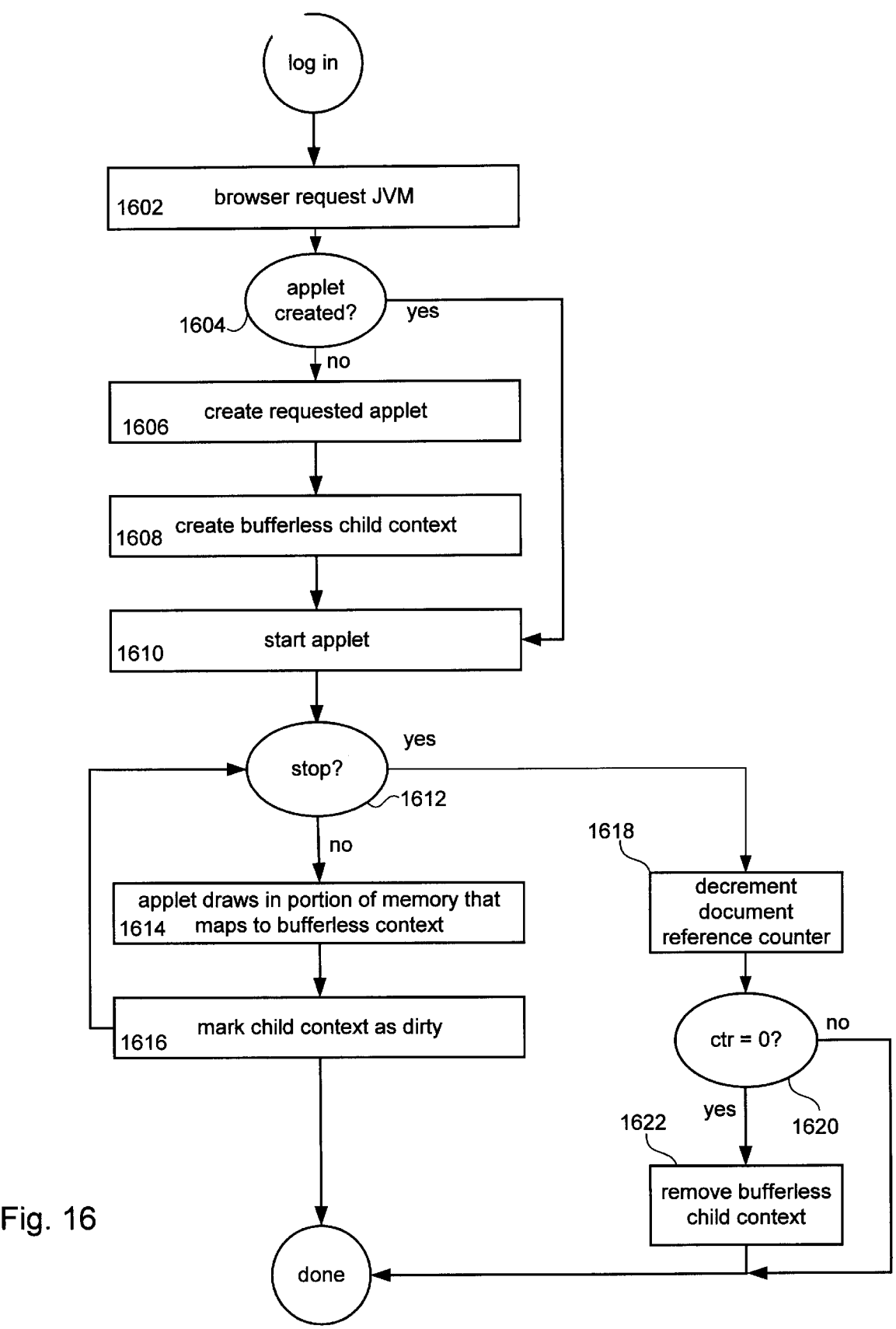
FIG. 16 shows a flowchart describing a process for executing an applet in accordance with an embodiment of the invention.

Referring now to FIG. 16, a flowchart describing a process 1600 for executing an applet in accordance with an embodiment of the invention. The process 1600 begins at 1602 by a browser requesting that an associated Java Virtual Machine (JVM) launch an applet. A determination is made at 1604 whether or not the requested applet has in fact been created. If it is determined that the requested applet has not been created, then control is passed to 1606 directing that the JVM create the requested applet. In creating the requested applet, the JVM creates a corresponding bufferless child context at 1608. In the case where, at 1604, the requested applet has been determined to be created or the JVM has just created the requested applet at 1606, the applet is started by the JVM at 1610. Once the applet has been started by the JVM at 1610, the applet runs until such time as a stop command is as determined at 1612 is received. While a stop command has not been received and the applet is therefor running, the applet draws in to that portion of the buffer memory that maps to the bufferless child context and the duplicate clip region at 1614. At 1616, the child context is marked as dirty and control is passed back to 1612 in both the JVM and browser loop for determining whether or not a stop command has been received. If the stop command has been received, then the document reference counter is decremented at 1618 and a determination at 1620 is made whether or not the reference counter ig equal zero. If the reference counter is not equal zero, then the process 1600 stops, otherwise, when the reference counter is equal to zero, then control is passed to 1622 where the bufferless child context is removed.

In summary, he described embodiment of the present invention provides one or more bufferless child contexts that correspond to elements in the HTML for a web page displayed by a browser. For example, each applet executed by the browser has a corresponding and separate child context where each child context draws into a portion of memory that maps directly to that bufferless child context. The browser also has a parent context, which each child context points to. When a graphic is displayed via a widget, the widget draws the graphic (such as a panel or a non-pressed button) in the child context of the applet and sets a "damage" flag in the child context. When the browser performs its main browser loop, it checks the status of the damaged flag for each element (including each applet). If the browser finds a damaged flag that is set, it "pulls" the information from the child buffer into the parent buffer memory, which is used to update the display screen. Thus, several separate threads in the JVM can be executing concurrently and updating graphics elements without interfering with each other.

The invention extends the AGL (Applications graphics library) routines to include (at least) routines to set up, delete, read, and modify child contexts and to copy information from child contexts to parent contexts. The DWL (developer's widget library) routines are extended to include a parameter identifying the context currently being worked on. The browser has been extended to implement the functionality of checking the damage flag of buffer of the parent context.

Reactive components, such as buttons, lists, choice bars, etc. Present special problems. When a widget, for example, a button, needs to show interactive behavior when pressed (like going up and down), this behavior must occur very rapidly—too rapidly to necessarily be picked up by a main browser loop, which executes relatively infrequently. Thus, a child context cannot update the display properly for a reactive component if it merely marks the child context as damaged and waits for the browser loop.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of controlling display of graphics data, comprising:
   sending a user input event, by a browser to a virtual execution environment;
   providing, in the virtual execution environment, a child context corresponding to a parent context in the browser and an applet that is executed by the browser;
   writing directly into a portion of a browser memory associated with the child context, a graphic in accordance with the user input event;
   pulling, by the browser, the graphic from the portion of the browser memory associated with the child context to the parent context; and
   displaying the graphic stored in the parent context on a display screen.

2. A method as recited in claim 1, wherein the user input event is a reactive graphics component including one of a button, list, and choice.

3. A method as recited in claim 1, wherein the user input event is a nonreactive graphics component including a panel, the non-reactive graphics component requiring non-interactive behavior.

4. A method as recited in claim 1, wherein the child context further includes a damage flag and a recursive update flag, the damage flag for indicating whether contents of the buffer of the portion of memory associated with the child context has changed, and the recursive update flag for indicating whether the applet contains a reactive element.

5. A method as recited in claim 1, further comprising providing a second child context in the virtual execution environment, corresponding to the parent context in the browser, where the child context corresponds to a second applet that is executed by the browser.

6. A method of controlling display of graphics data, comprising:
   sending a graphics event by a browser to a virtual execution environment,
   providing, in the virtual execution environment, a bufferless child context corresponding to a parent context having a parent buffer associated therewith in the browser and an applet that is executed by the browser, wherein the bufferless child context is associated with a portion of a browser memory;
   writing directly to the portion of the browser memory associated with the bufferless child context by the virtual execution environment, a first graphic in accordance with the graphics event, providing an interactive behavior if the graphic event is reactive including:
      writing into a buffer of the parent context, by the virtual execution environment, the first graphic in accordance with the graphics event, the parent buffer being used for displaying the graphic data on a display screen;
   waiting a predetermined amount of time;
   writing directly into the portion of the browser memory associated with the child context and the buffer of the parent context by the virtual execution environment, a second graphic in accordance with the graphics event to be displayed on the display screen;
   providing an orphan context for behind the scenes drawing wherein contents of the orphan context being indirectly drawn on a display screen via the portion of memory associated with the child context;
   pulling, by the browser, the graphic from the child context to the parent context;
   returning execution control to the browser for the virtual execution environment; and
   displaying the graphic stored in the parent context on the display screen.

7. A method as recited in claim 6, wherein the virtual execution environment provides applications graphics library (AGL) routines, including a child context set up routine, a child context delete routine, a child context read routine, a child context modify routine, and a routine for copying information from the child context to the parent context.

8. A method as recited in claim 7, wherein the method further includes invoking a routine, the routine being one of the AGL routines.

9. A method as recited in claim 6, wherein the applet is one of multiple applets executed as different threads by the browser, each of the applets being associated with a child context, each child context corresponding to the parent context.

10. A method as recited in claim 9, wherein each child context corresponds to a browser element displayed on the display screen.

11. A method as recited in claim 10, wherein each browser element is associated with an HTML element for a page displayed on the display screen.

12. A method as recited in claim 6, wherein the child context further includes a damage flag indicating whether the corresponding portion of the browser memory has been changed.

13. A method as recited in claim 6, wherein the child context further includes a recursive update flag indicating whether the associated applet contains a reactive element.

14. An apparatus that controls display of graphics data, comprising:
   software circuitry configured to send a user input event, by a browser to a virtual execution environment;
   software circuitry configured to provide in the virtual execution environment, a child context corresponding to a parent context in the browser and an applet that is executed by the browser;
   software circuitry configured to write directly into a portion of a browser memory associated with the child context, a graphic in accordance with the user input event;
   software circuitry configured to pull, by the browser, the graphic from the portion of a browser memory associated with the child context to the parent context and
   software circuitry configured to display the graphic stored in the parent context on a display screen.

15. A computer program product, comprising:

a computer usable medium having computer readable code embodied therein for controlling the display of graphics data, comprising:

a computer readable program code configured to cause a user input event to be sent by a browser to a virtual execution environment;

computer readable program code configured to cause a child context to be provided in the virtual execution environment, the child context corresponding to a parent context in the browser and an applet that is executed by the browser;

computer readable program code configured to cause a widget library component to write directly into a portion of a browser memory associated with the child context, a graphic in accordance with the user input event;

computer readable program code configured to pull, by the browser, the graphic from the portion of a browser memory associated with the child context, to the parent context; and computer readable program code configured to display the graphic stored in the parent context on a display screen.

* * * * *